United States Patent
Hui et al.

Patent Number: 5,450,089
Date of Patent: Sep. 12, 1995

[54] MONOPULSE THRESHOLDING

[75] Inventors: Leo H. Hui, Los Angeles; Roy T. Okida, Gardena, both of Calif.

[73] Assignee: Hughes Aircraft Company, Los Angeles, Calif.

[21] Appl. No.: 269,331

[22] Filed: Jun. 30, 1994

[51] Int. Cl.$^6$ .......................... G01S 13/44; G01S 7/34
[52] U.S. Cl. .................................... 342/195; 342/194; 342/91; 342/140; 342/152
[58] Field of Search .................. 342/195, 91, 92, 197, 342/140, 149, 152, 194

[56] References Cited

U.S. PATENT DOCUMENTS

| | | | |
|---|---|---|---|
| 3,890,617 | 6/1975 | Moulton | 342/94 |
| 3,935,572 | 1/1976 | Broniwitz et al. | 342/80 |
| 4,231,037 | 10/1980 | Long | 342/149 |
| 4,331,958 | 5/1982 | Lacomme | 342/152 |
| 4,486,756 | 12/1984 | Peregrim et al. | 342/149 |
| 5,017,929 | 5/1991 | Tsuda | 342/157 X |
| 5,101,209 | 3/1992 | Martin | 342/152 |
| 5,103,233 | 4/1992 | Gallagher et al. | 342/158 X |

*Primary Examiner*—John B. Sotomayor
*Attorney, Agent, or Firm*—Leonard A. Alkov; W. K. Denson-Low

[57] ABSTRACT

A monopulse thresholding processor and method for improving resolution by using the difference channel data to eliminate "excess" sum channel returns. The processor may be used with a radar system that comprises an antenna, a transmitter, a receiver for processing transmitted radar signals to produce radar returns therefrom, a log compressor for converting radar returns to log values, and a display for displaying the radar returns. The signal processor comprises a left sum and right sum generator coupled to the receiver for computing a left sum and a right sum from radar returns generated by the receiver. A pseudo-difference generator is coupled to the left sum and right sum generator for generating pseudo-difference channel data. A beam sharpener is coupled to the left sum and right sum generator and to the pseudo-difference generator for beam sharpening the radar returns. A minimums generator coupled between the left sum and right sum generator and the beam sharpener for processing outputs from the left sum and right sum generator, for comparing them to a threshold value, and for providing an output signal comprising a minimum of the processed radar returns. The present invention generates a pseudo-difference channel using sum channel dam, thereby reducing hardware and software, and uses the difference channel as a threshold for keeping the sum channel returns. The sum channel returns are not modified by the difference channel returns if the threshold is exceeded. Therefore, sidelobes resulting from intermixing of the sum and difference channel returns are not possible, thereby eliminating generation of false targets. Also, because sum channel returns that exceed the threshold are not modified, these signals remain at their original strength. The present invention uses the pseudo difference channel data as a threshold on the sum channel data to perform beam sharpening that sharpens discrete target and clutter edges.

10 Claims, 4 Drawing Sheets

MONOPULSE THRESHOLDING

BACKGROUND

The present invention relates generally to radar signal processing, and more particularly, to a signal processor and signal processing method that implements monopulse thresholding to improve azimuth resolution and provide enhanced radar imagery.

A method that uses signals derived from the difference channel to improve azimuth resolution, known as monopulse resolution improvement, was previously investigated by the assignee of the present invention. The study found that the monopulse resolution improvement method separated targets only under conditions where the targets have a high signal-to noise ratio and are already visually separable. It was concluded that the monopulse resolution improvement method was unsuited for image sharpening, because even when targets are separable by the monopulse resolution improvement method, the method produced false targets from sidelobes.

The monopulse resolution improvement method was implemented using the following steps. Let SUM(n) be the sum channel signal for an image cell n. Let |DIFF(n)| be the magnitude of the difference channel signal for an image cell n. Let k be a known constant multiplier. Then for each image cell n, IF SUM(n)>k |DIFF(n)|,
THEN use SUM(n)—k |DIFF(n)|1 as the image signal for that cell,
ELSE, set the image signal for the cell to 0.

U.S. Pat. No. 4,978,680, issued Dec. 18, 1990, uses monopulse radar returns to achieve resolution improvement. This patent uses sum and difference channel data to form discriminants, and then using the discriminants, it repositions the sum channel signal data to the measured azimuth value. This technique does well in sharpening discrete targets but has problems with distributed clutter and targets. It also requires the radar to receive in two channels instead of one. This technique is subject to positioning the returns in the wrong location in low signal-to-noise ratio conditions or in multiple targets in the beam conditions.

Consequently, heretofore monopulse signals were used to provide azimuth beam sharpening and required that the sum and azimuth difference channels be received in the radar separately in order to use the data to perform the beam sharpening. Furthermore, monopulse signals were used to provide beam sharpening using the sum and difference dam to generate a discriminant in order to perform the beam sharpening.

It is therefore an objective of the present invention to provide for a signal processor and processing method that reduces the need to receive two channels by generating a pseudo azimuth difference channel information from the sum channel information. It is a further objective of the present invention to provide for a signal processor and signal processing method that uses the pseudo difference channel data as a threshold on the sum channel data to perform the beam sharpening.

SUMMARY OF THE INVENTION

The present invention provides for a signal processor and monopulse thresholding processing method that is somewhat similar to the above-described monopulse resolution improvement method in that both improve resolution by using difference channel data to help eliminate excess sum channel returns. The prior monopulse resolution improvement method uses the real difference channel, whereas the present monopulse thresholding method generates a pseudo-difference channel signal using sum channel signal data, thereby reducing hardware and software requirements. The present invention uses the difference channel only as a threshold for keeping the sum channel signals. The sum channel signals are not modified by the difference channel signals if the threshold is exceeded. Hence, sidelobes resulting from the intermixing of the sum and difference channel signals are not possible with the present invention, thereby eliminating the generation of false targets. Also, because sum channel signals that exceed the threshold are not modified, the present invention keeps the signals the same strength as those prior to the resolution improvement process.

The present invention generates pseudo-azimuth difference channel information from the sum channel information, hence reducing the need to receive two channels. The present invention uses the pseudo-difference channel data as a threshold on the sum channel data to perform the beam sharpening. The present beam sharpening technique sharpens clutter edges and discrete targets.

More particularly, the present invention is a radar signal processor for use with a radar system that comprises an antenna, a transmitter, a receiver for processing radar return signals, a log compressor for convening the radar returns to log values using a log lookup table, and a display for displaying the log value radar returns. The signal processor comprises a left sum and right sum generator coupled to the receiver for computing a left sum and a fight sum from the radar retums generated by the receiver. A pseudo-difference generator is coupled to the left sum and fight sum generator for generating pseudo-difference channel dam. A minimums generator is coupled to the left sum and right sum generator for computing the minimum of the signals within the processing window. A beam sharpener is coupled to the left sum and right sum generator, to the pseudo-difference generator, and to the minimums generator for performing the beam sharpening on the radar returns.

The present invention improves the azimuth resolution of real beam radars by a factor of 2:1. Because the present invention uses a monopulse method that requires a single channel of data (sum only), no hardware and software is required to process the difference channel. Multiple iterations are not required, and therefore the present invention is capable of providing high image update rates. Improved resolution is available for imagery along the velocity vector, which cannot be done with Doppler-type resolution improvement techniques. The present invention improves resolution for clutter edges (airport runway edges, for example) as well as for discrete targets.

The present invention may be adapted for use in any radar that provides real beam imaging and will improve their azimuth resolution maps. Regarding commercial radars for use in electric vehicles, for example, the present invention permits the use of a single X-band type radar instead of using both an X-band and a millimeter wave type radar, that require dual aperture system and additional hardware. The improved resolution provided by the present invention when used with the X-band radar provides a desired radar image. Thus, only a single aperture system is required. If a millimeter wave type radar is required, the present invention will improve the resolution of its imagery as well. Lastly, the present invention may also be used in air-to-air search applications to help quickly refine target positions without logic for target centroiding or calculations for angle discriminants, thus reducing processing time and thereby allowing more targets to be processed.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
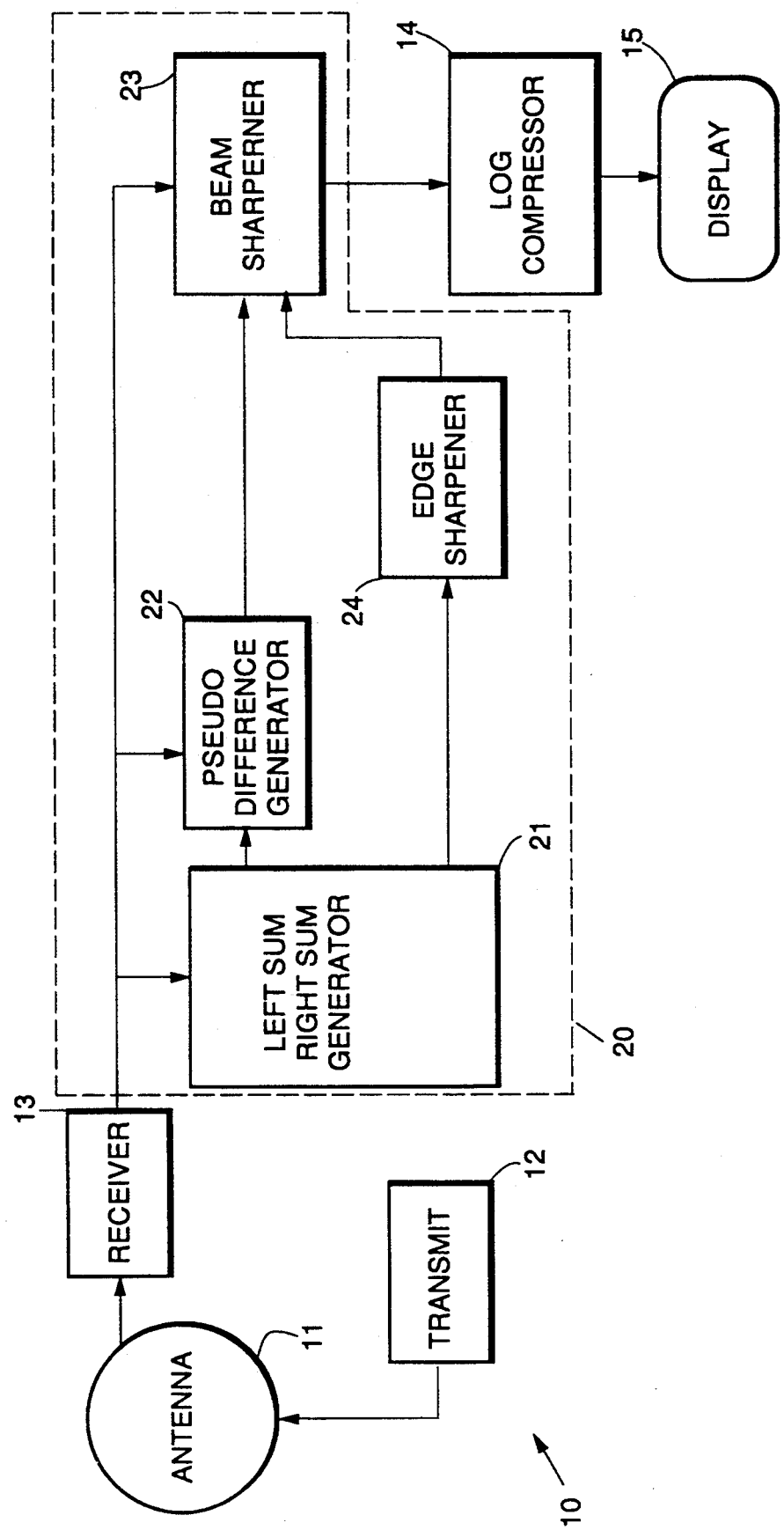
FIG. 1 shows a monopulse thresholding processing system in accordance with the principles of the present invention.

Referring to the drawing figures, FIG. 1 shows a monopulse thresholding processing system 10 and also illustrates a processing method in accordance with the principles of the present invention. The monopulse thresholding processing system 10 is comprised of an antenna 11 having a radar transmitter 12 and a radar receiver 13 coupled thereto. Monopulse thresholding processing in accordance with the present invention is implemented in a portion of the processing system 10 contained within a dashed processing block 20, hereinafter referred to as a monopulse thresholding processor 20. The output of the monopulse thresholding processor 20 is coupled by way of a log compressor 14 to a radar display 15.

The monopulse thresholding processor 20 comprises a left sum and right sum generator 21, a pseudo-difference generator 22, a beam sharpener 23, and a minimums generator 24. The left sum and fight sum generator 21 computes a left sum value and a fight sum value from the sum channel radar signal output of the receiver 13. The sum channel radar signals are signals that are output from the antenna 11 to the receiver 13 as the antenna 11 scans in azimuth. The left sum and fight sum values of the left sum and fight sum generator 21 are applied to the pseudo-difference generator 22. The current sum signal and four previous sum signals are output from the left sum and fight sum generator 21 to the minimums generator 24. The second delayed sum signal amplitude from the left sum and right sum generator 21 are output to the beam sharpener 23. The output of the pseudo-difference generator 22 is coupled to the beam sharpener 23. The output of the minimums generator 24 is also coupled to the beam sharpener 23. Outputs of the beam sharpener 23 are coupled to the log compressor 14.

The resolution improvement technique of the present invention is identified herein as monopulse thresholding. The monopulse thresholding of the present invention is used to sharpen targets and edges of objects (such as runways, for example) while preserving the overall image structure.

The monopulse thresholding processing system 10 shown in FIG. 1 is designed to improve the resolution of the radar imagery. The monopulse thresholding processor 20 processes high value and low value radar returns. High value radar returns are typically derived from discrete or distributed targets. Low value radar returns are typically background clutter returns. The monopulse thresholding processor 20 and the present processing method compares each sum signal radar return with a threshold value that is formed by scaling the absolute value of the differences between its neighbors. The difference between the neighbors is referred to herein as a pseudo-difference value.

Figure 2:
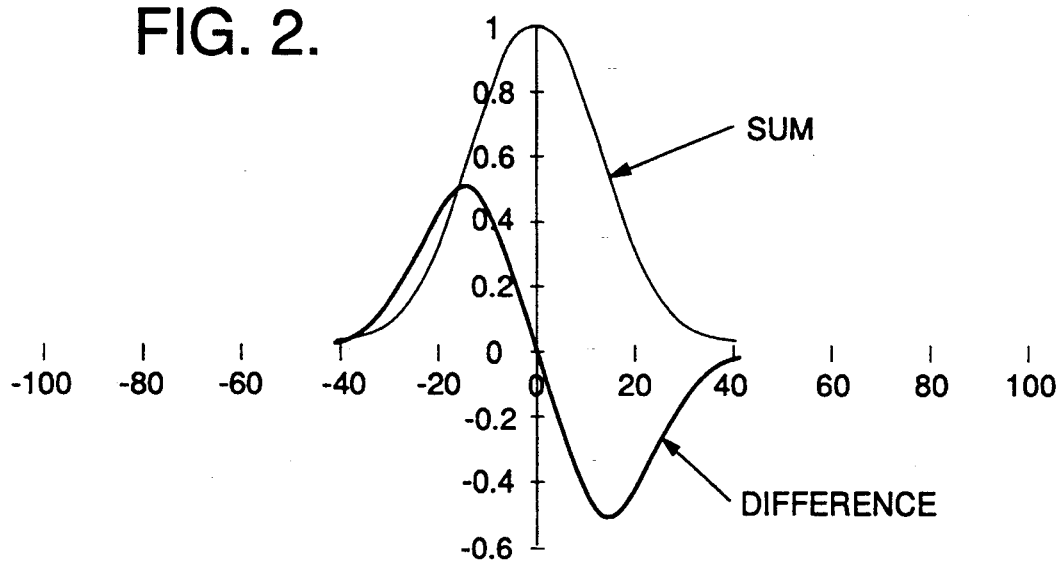
FIG. 2 shows a sum channel signal pattern and corresponding pseudo-difference channel signal pattern generated by the monopulse thresholding processing system of FIG. 1.

FIG. 2 shows sum channel signal pattern returns and corresponding pseudodifference channel signal pattern generated by the receiver 13 and the monopulse thresholding processor 20 as a result of data collected during a scan of the antenna 11. Radar returns whose sum signal amplitudes are greater than a scaling of the pseudo-difference signal amplitudes are kept, while sum signals having amplitudes below it is set equal to the output value of the minimums generator 24.

Figure 3:
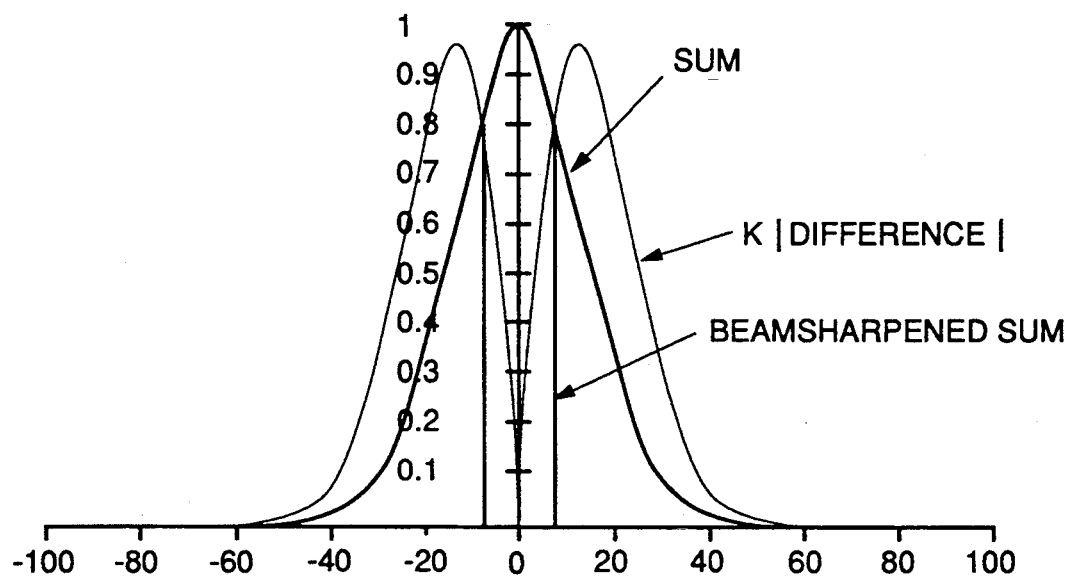
FIG. 3 shows a sharpened sum signal for a single discrete target return, and an unsharpened sum signal associated with the radar return.

FIG. 3 shows a sharpened sum signal for a single discrete target return and an unsharpened sum signal associated with a single discrete target radar return, for a value K|Difference| for K=2. Low value sum signal amplitudes are typically derived from clutter.

Figure 4:
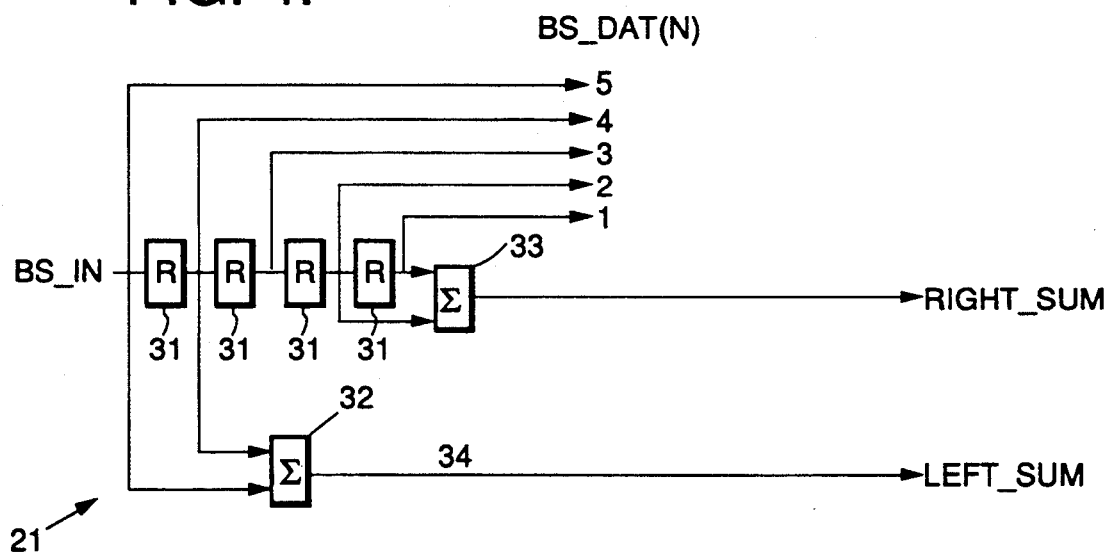
FIG. 4 illustrates an implementation of a left sum and fight sum generator that computes left and fight sums in the monopulse thresholding processing system of FIG. 1.

FIG. 4 illustrates an implementation of the left sum and right sum generator 21 that computes left sum and right sum returns in the monopulse thresholding processing system 10 of FIG. 1. These sums are computed as follows. The amplitudes of sum channel radar returns derived from the receiver 13, given by BS_IN, are sequentially applied to four delay elements (R) 31. The current sum signal and the output from the first delay element 31 are applied to a fast summing device 32 to produce a left sum value (LEFT_SUM). Delayed signals from the last two delay elements 31 are applied to a second summing device 33 to produce a right sum value (RIGHT_SUM). Delayed sum channel signals comprising outputs of each delay element 31 are sent to the minimums generator 24 as a BS_DAT(N) signal (for N from 1 to 5).

Figure 5:
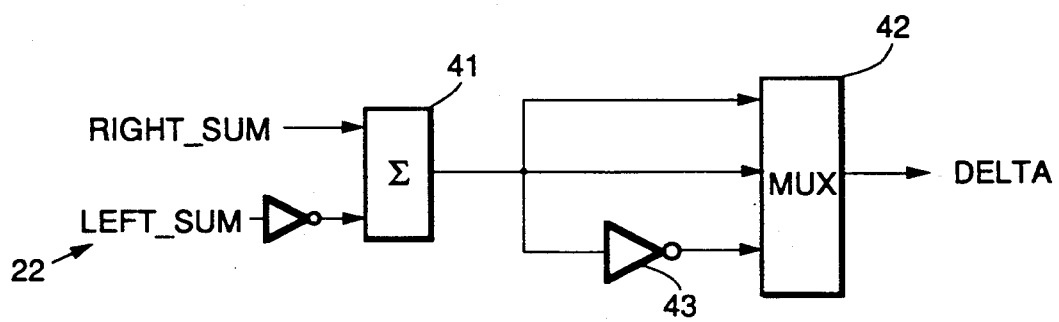
FIG. 5 illustrates an implementation of a pseudo-difference generator of the monopulse thresholding processing system of FIG. 1.

FIG. 5 illustrates an implementation of the pseudo-difference generator 22 of the monopulse thresholding processing system 10 of Fig. 1. The pseudo-difference generator 22 is comprised of a summing device 41 that receives the fight sum value (RIGHT_SUM) and an inversion of the left sum value (LEFT_SUM) and produces a summed value. The summed value is coupled to a multiplexer 42. An inverted summed value is produced by an inverter 43 and is coupled to a second input of the multiplexer 43. The multiplexer 42 produces an absolute value of the pseudodifference signal, given by the term DELTA.

Figure 6:
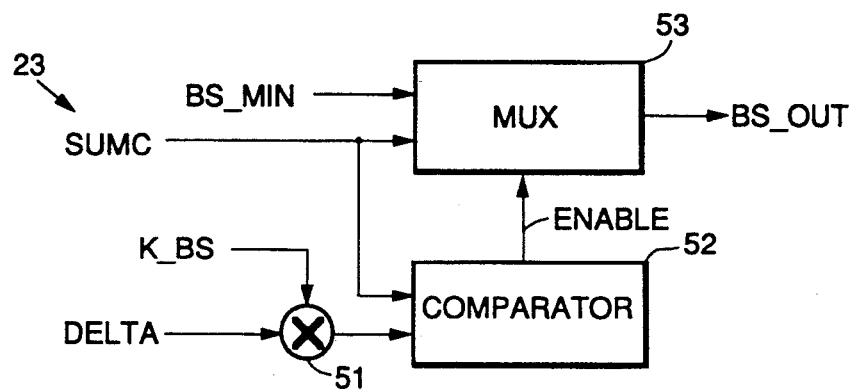
FIG. 6 illustrates an implementation of a beam sharpener of the monopulse thresholding processing system of FIG. 1.

FIG. 6 illustrates an implementation of the beam sharpener 23 of the monopulse thresholding processing system 10 of FIG. 1. The beam sharpener 23 is comprised of a mixer 51, a compantor 52, and a multiplexer 53. The absolute value of the pseudodifference signal, DELTA, and a prestored constant multiplier, K_BS, are applied to the mixer 51 which produces a mixed output signal that is coupled to one input of the comparator 52. The BS_DAT(3) signal from the left sum and fight sum generator 21 is applied to a second input of the comparator 52 and to a first input of the multiplexer 53. The comparator compares the BS_DAT(3) signal and the mixed output signal to generate an enabling signal that is applied to the multiplexer 53. The enabling signal enables the multiplexer 53 to select either the BS_MIN signal or the BS_DAT(3) signal for outputting. If the mixed signal is greater than or equal to the BS_DAT(3) signal then the BS_MIN signal is selected for output; otherwise, the BS_DAT(3) signal is output. An output of the minimums generator 24, comprising a minimum value (BS_MIN), is applied to a second input of the multiplexer 53. The multiplexer 53 produces a beam sharpened output signal (BS_OUT) from the monopulse thresholding processor 20 which is applied to the log compressor 14 and thereafter to the display 15. The processed return is converted to log values by the log compressor 14 using a log lookup table, for example, and is displayed on the display 15.

Figure 7:
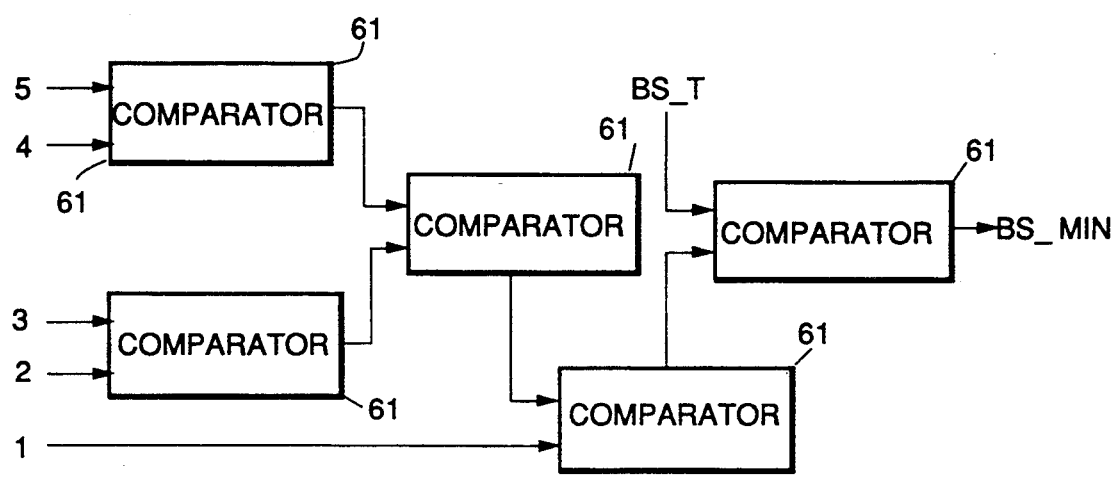
FIG. 7 illustrate an implementation of a minimums generator of the monopulse thresholding processing system of FIG. 1.

FIG. 7 illustrates an implementation of the minimums generator 24 of the mono-pulse thresholding processing system 10 of FIG. 1. The minimums generator 24 is comprised of a plurality of comparators 61. The minimums generator 24 receives the five signals provided by the left sum and fight sum generator 21 (BS_DAT(N) for N from 1 to 5), and receives a prestored threshold value, BS_T, and sequentially compares each signal to the prestored threshold value to determine the minimum value to output, given by BS_MIN.

For completeness, the equations implemented in the monopulse thresholding processor 20 that were generally described above with respect to FIGS. 4–7 are as follows:

LET BS_IN be the amplitudes of the sum channel from radar returns derived from the receiver 13,
LET [i] be the number of the $i^{th}$ sum channel signal amplitudes during an antenna scan,
LET BS_T be a prestored threshold value,
THEN
    LEFT_SUM = BS_IN[i−2] + BS_IN[i−1]
    RIGHT_SUM = BS_IN[i+2] + BS_IN[i+1]
    DELTA = |RIGHT_SUM − LEFT_SUM|
    BS_MIN = MIN(BS_IN[i−2], BS_IN[i−1], BS_IN[i],
        BS_IN[i+1], BS_IN[i+2], BS_T)
IF (BS_IN[i] > K_BS · DELTA), THEN
    BS_OUT = BS_IN[i]
ELSE
    BS_OUT = BS_MIN.

Because the monopulse thresholding processor 20 and processing method of the present invention uses two adjacent left and fight radar return values, the beginning two and last two azimuth sectors are not modified. Test results using the monopulse thresholding processor 20 and processing method are as follows. The monopulse thresholding processor 20 and processing method were tested using a real beam map image and produced good imaging results. Radar data of the Edwards AFB airfield were collected, and a 10 nautical mile map was generated. This area is of particular interest because of its lakebeds, runways, and bright hanger returns. Map images were generated that have eight shades of gray with 4.5 dB per gray shade. The runway was clearly identified along the middle of the map. The data collected from this map was processed by a computer that implemented the monopulse thresholding processor 20 of the present invention and the processed image was redisplayed for photo generation. The monopulse thresholding processor 20 nicely sharpened the image and highlighted targets in the image.

Thus there has been described a new and improved signal processor and signal processing method that implements monopulse thresholding to improving azimuth resolution and provide enhanced radar imagery. It is to be understood that the above-described embodiment is merely illustrative of some of the many specific embodiments which represent applications of the principles of the present invention. Clearly, numerous and other arrangements can be readily devised by those skilled in the an without departing from the scope of the invention.

What is claimed is:

1. A radar signal processor for use with a radar system that comprises an antenna, a transmitter coupled to the antenna, a receiver coupled to the antenna for processing transmitted radar signals to produce radar returns therefrom, a log compressor that is adapted to convert the radar returns to log values, and a display coupled to log compressor for displaying the radar returns, said signal processor comprising:

a left sum and fight sum generator coupled to the receiver for computing a left sum and a fight sum from radar returns generated by the receiver;

a pseudo-difference generator coupled to the left sum and fight sum generator for generating pseudo-difference channel data;

a beam sharpener coupled to the left sum and fight sum generator and to the pseudo-difference generator for beam sharpening the radar returns; and a minimums generator coupled between the left sum and fight sum generator and the beam sharpener for processing outputs from the left sum and right sum generator, for comparing them to a threshold value, and for providing an output value comprising a minimum of the processed radar returns.

2. The radar signal processor of claim 1 wherein the left sum and right sum generator comprises:

a plurality of delay elements for sequentially delaying the amplitudes of sum channel signal radar returns derived from the receiver;

a first summing device coupled to the receiver for processing a current sum channel signal amplitude and an output of the first delay element to produce a left sum value; and a second summing device coupled to outputs of the last two delay elements for processing a delayed sum channel signal amplitudes derived therefrom to produce a fight sum value;

and wherein the current sum channel signal amplitudes and outputs of each delay element are coupled to the minimums generator.

3. The radar signal processor of claim 1 wherein the pseudo-difference generator comprises:

a summing device for processing the right sum value (RIGHT_SUM) and an inversion of the left sum value (LEFT_SUM) to produce a summed output signal;

an inverter coupled to the summing device for generating an inverted summed output signal; and a multiplexer coupled to the summing device and to the inverter for processing the summed output signal and the inverted summed output signal and for generating an absolute value of the pseudo-difference output signal (DELTA).

4. The radar signal processor of claim 1 wherein the beam sharpener comprises:

a mixer for processing the absolute value of the pseudo-difference signal (DELTA) and a prestored constant multiplier (K_BS) to provide a mixed output signal;

a comparator coupled to the mixer for comparing a predetermined delayed signal (BS_DAT(3)) and the mixed output signal from the mixer to generate an enabling signal; and a multiplexer for processing the predetermined delayed signal (BS_DAT(3)) and a minimum value return (BS_MIN) to select a beam sharpened signal (BS_OUT) therefrom in response to the enabling signal.

5. The radar signal processor of claim 1 wherein the minimums generator comprises:

a plurality of comparators for processing the sum channel signals (BS_DAT(N)) to sequentially compare each signal to determine a minimum signal value and for comparing the minimum signal value to a predetermined threshold (BS_T) to produce a minimum value (BS_MIN).

6. A signal processing method for use with a radar system that comprises an antenna, a transmitter coupled to the antenna, a receiver coupled to the antenna for processing transmitted radar signals to produce radar returns therefrom, a log compressor that is adapted to convert the radar returns to log values, and a display coupled to the log compressor for displaying the radar returns, said method comprising the steps of:

computing a left sum value and a fight sum value from radar returns generated by the receiver;

computing pseudo-difference channel amplitudes derived from the left sum value and the right sum value;

comparing delayed data derived from the sum channel to a threshold value to generate an output signal comprising a minimum of the processed radar returns; and beam sharpening the radar returns.

7. The method of claim 6 wherein the step of computing the left sum and right sum comprises the steps of:

sequentially delaying the amplitudes of sum channel radar returns;

generating a left sum value from a current sum signal amplitude and a first delayed radar return; and generating a right sum value from the last two delayed radar returns.

8. The method of claim 6 wherein the step of computing pseudo-difference channel amplitudes comprises the steps of:

summing the fight sum value and an inverted left sum value to produce a summed return;

inverting the summed return to provide an inverted summed return; and combining the summed return and the inverted summed return to generate an absolute value of the pseudo-difference return.

9. The method of claim 6 wherein the step of comparing delayed data comprises the step of:

comparing each delayed radar signal amplitude (BS_DAT(N)) to a prestored threshold (BS_T) to generate a minimum value (BS_MIN).

10. The method of claim 6 wherein the step of beam sharpening comprises the steps of:

mixing the absolute value of the pseudo-difference signal (DELTA) and a prestored constant (K_BS) to provide a mixed output signal;

comparing a predetermined delayed sum signal amplitude (BS_DAT(3)) and the mixed output signal from the mixer to generate an enabling signal; and generating a beam sharpened output signal (BS_OUT) in response to the enabling signal which selects either the predetermined delayed sum signal amplitude (BS_DAT(3)) or a minimum value (BS_MIN) as the beam sharpened output signal.

* * * * *